May 27, 1924.
J. H. HOLZHAUSEN
1,495,181
SPRING POWER TRANSMISSION
Filed Feb. 9, 1923
2 Sheets-Sheet 1
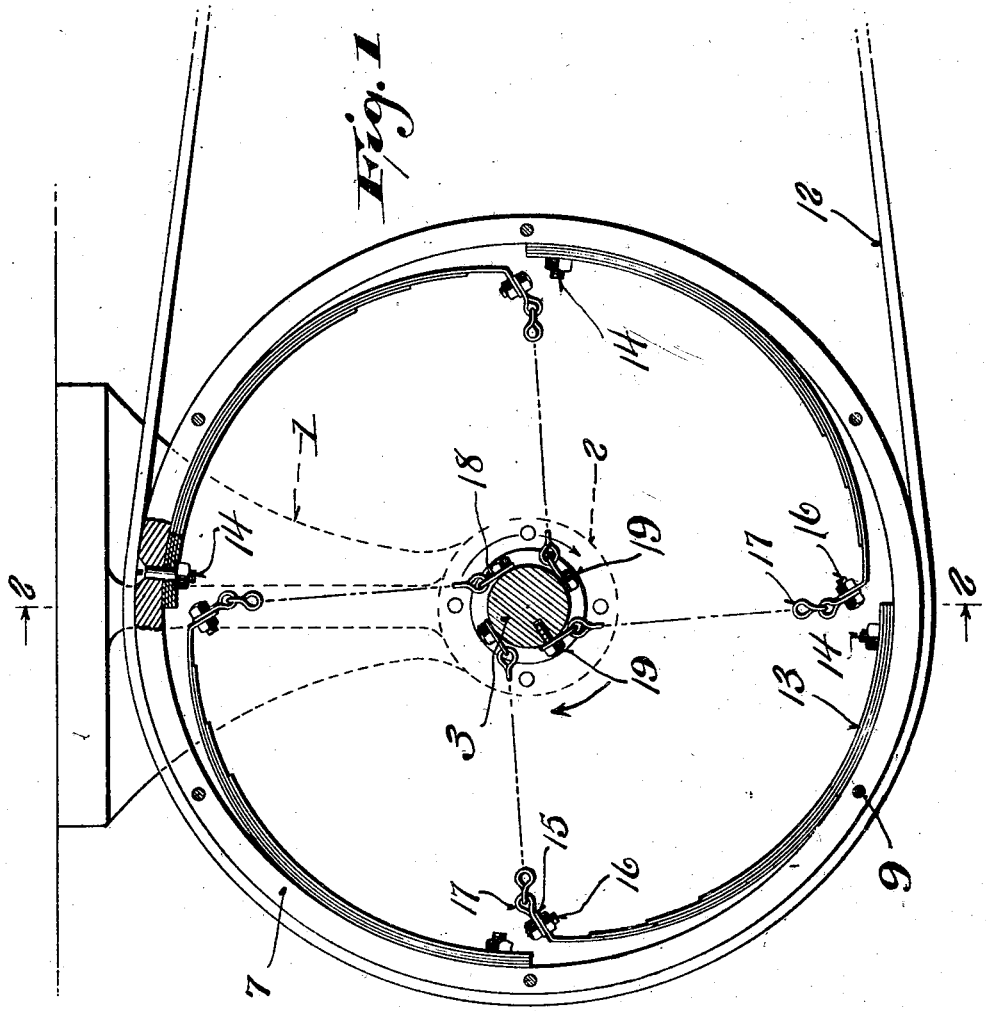

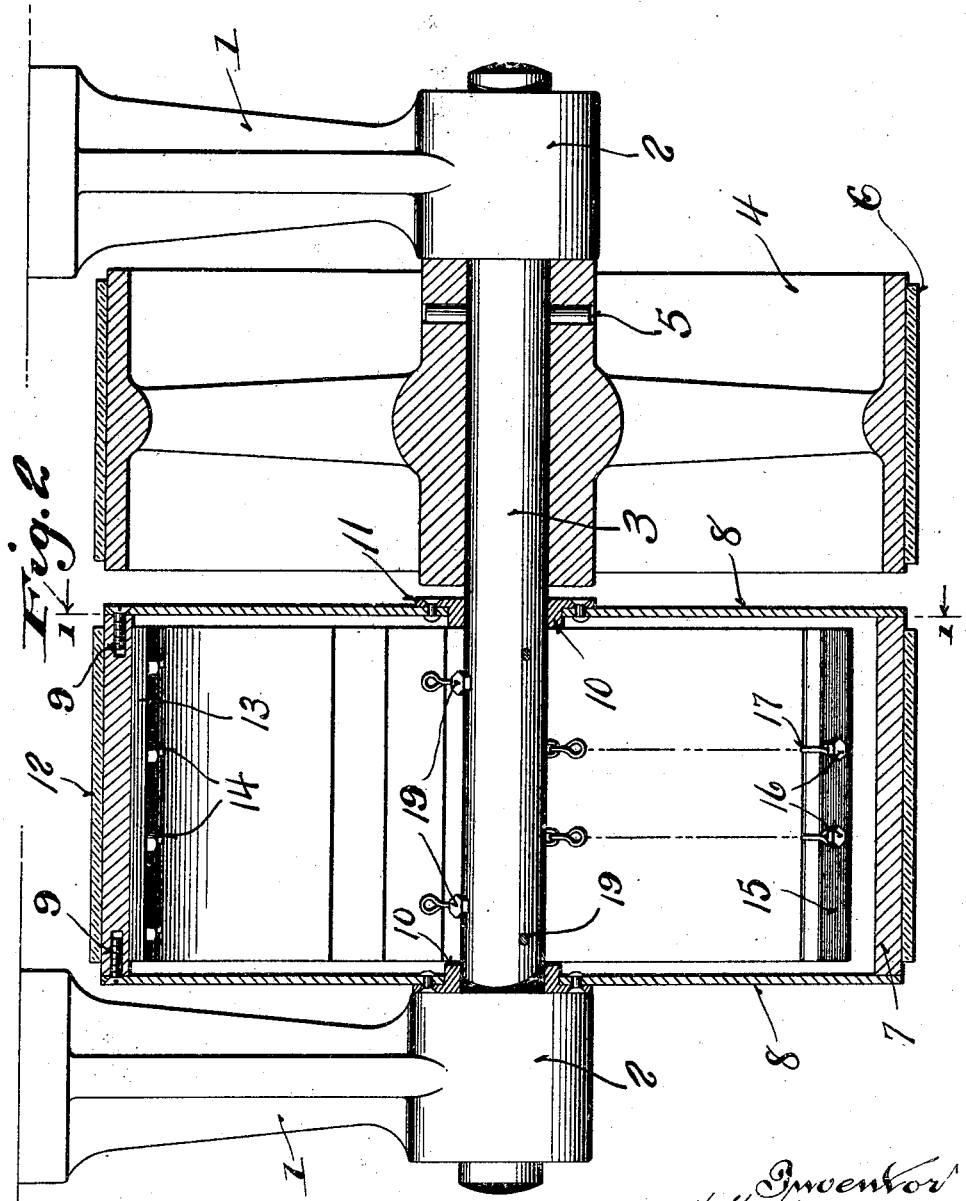

Patented May 27, 1924.

1,495,181

UNITED STATES PATENT OFFICE.

JOHN H. HOLZHAUSEN, OF MILWAUKEE, WISCONSIN.

SPRING POWER TRANSMISSION.

Application filed February 9, 1923. Serial No. 617,959.

*To all whom it may concern:*

Be it known that I, JOHN H. HOLZHAUSEN, a citizen of the United States, and resident of Milwaukee, in the county of Milwaukee and State of Wisconsin, have invented certain new and useful Improvements in Spring Power Transmissions; and I do hereby declare that the following is a full, clear, and exact description thereof.

This invention relates to spring power transmissions where a substantially continuous winding of the energy-storing spring, and a substantially continuous delivery of power from such spring, is maintained. These objects are attained in the present invention, and the time of running down of the spring is indefinitely prolonged, that is to say, as long as the apparatus is in operation, the spring is continuously transmitting power and continuously being rewound.

Further objects of this invention are to provide a spring power transmission, in which the utmost of simplicity of construction is attained, in which a minimum of moving parts with consequent high efficiency is secured, and in which an eminently practical and serviceable device results.

An embodiment of the invention is shown in the accompanying drawings, in which—

Figure 1 is a transverse sectional view through the spring power transmission, such view corresponding to a section on the line 1—1 of Figure 2.

Figure 2 is a longitudinal sectional view through the spring power transmission, such view corresponding to a section on the line 2—2 of Figure 1.

Referring more particularly to the drawings, it will be seen that the spring power transmission is carried in any suitable manner, as for example, by means of hangers 1, which in the form shown extend downwardly from the ceiling; obviously any form of support may be used which provides a pair of aligned bearings, as indicated at 2 in the drawing. A horizontal shaft 3, is mounted within these bearings and carries a driven pulley 4, which is rigidly secured thereto in any suitable manner, as for instance, by means of the pin 5. This pulley is adapted to receive a driving belt 6, from the source of power and to accordingly rotate the shaft 3.

Adjacent the pulley, a drum provided with an outer rim 7, is mounted and is suitably equipped with end-plates or closure plates 8, which are removably attached thereto in any convenient manner, as for instance, by means of the screws 9. These closure plates are each provided with a relatively large central aperture within which is positioned a bearing hub 10, which loosely rides upon the shaft 3. These hubs may conveniently be provided with external flanges 11, which are secured to the closure plates 8 by means of counter-sunk rivets. This drum constitutes the driving pulley of the transmission and is adapted to receive a belt 12, by which it is connected with the load.

A plurality of leaf springs 13, are secured to the inner side of the rim 7, as indicated in the drawings, in any suitable, rigid and secure manner. A convenient way of attaching these springs is by means of bolts 14, which are provided with heads counter-sunk in the outer face of the rim 9, and with interior nuts which are clamped down against the leaf springs. These springs are formed of an outer elongated member and successively shorter inner members, so as to prevent overstraining of any portion of the springs by properly proportioned stresses and deflections of the parts. The outer member is provided with an inturned or angular offset portion 15, which is apertured and receives a bolt 16. The bolt 16 is passed through the end link of a chain, or through flexible connector 17; the inner end of each of the flexible connectors 17, is attached to the shaft 3, in any suitable manner, as for example, by means of apertured plates or clips 18, secured in position by means of the bolts 19.

It is to be understood that other driven and driving means may be employed. For instance, the pulley 4 and the drum may be replaced by an ordinary gear, for instance, and a hollow gear, respectively. It is understood, therefore, that the specific showing of a belt drive may be varied in both the power-receiving and the power-delivery portions of the apparatus.

The operation of the apparatus is as follows: The pulley 4 is rotated by means of the belt 6, and drives the shaft 3 in the direction indicated by the arrow in Figure 1. The rotation of the shaft relatively to the drum 7, winds the flexible connectors about the shaft and puts the springs 13 under stress. These springs transmit the stress to the outer periphery of the drum and cause the drum to rotate and drive the load by means of the belt 12. It is to be noted that the turning effort of the shaft is transmitted by the flexible connectors and the springs to the periphery of the drum, and causes the drum to rotate. In effect, this constitutes a continuous delivery of power by means of the action of the springs in their effort to straighten or unwind and simultaneously constitutes a continuous rewinding of the springs.

It will be seen, therefore, that a spring power transmission has been provided, in which the continuous winding and continuous unwinding of the springs occurs. It will also be seen that extreme simplicity of construction has been attained, and a minimum of moving parts have been employed, thereby materially reducing losses.

Although one specific form of the invention has been described in considerable detail, it is to be understood that the invention may take various forms and is, therefore, limited only as set forth in the appended claims.

I claim:

1. A spring power transmission comprising a driven shaft, a drum loosely mounted thereon and having an outer rim, a plurality of leaf springs, each spring having one end secured to said rim and the other end free and normally lying adjacent said rim, and a plurality of flexible connectors joining said shaft and the free ends of said springs.

2. A spring power transmission comprising a rotary shaft, a pulley rigidly secured to said shaft, a drum loosely mounted upon said shaft and having a peripheral rim, a plurality of leaf springs, each spring having one end secured to the inner side of said rim and the other end free and normally lying adjacent said rim, and a plurality of flexible connectors joining said shaft and the free ends of said springs.

3. A spring power transmission comprising a shaft, a power receiving means rigidly attached thereto, a drum having a peripheral rim, side plates attached to said rim to close the drum, said plates being loosely supported from said shaft, a plurality of regularly spaced leaf springs having heavy and light ends, means for securing the said heavy ends to the inner side of said rim, the other ends of said springs being free, and a plurality of flexible connectors joining the free ends of said springs with said shaft at points spaced around said shaft.

In testimony that I claim the foregoing and have hereunto set my hand at Milwaukee, in the county of Milwaukee and State of Wisconsin.

JOHN H. HOLZHAUSEN.